(12) United States Patent
Brock et al.

(10) Patent No.: US 12,314,705 B2
(45) Date of Patent: *May 27, 2025

(54) SYSTEM AND METHOD FOR PHASED SOFTWARE UPDATE DEPLOYMENT

(71) Applicant: ZEBRA TECHNOLOGIES CORPORATION, Lincolnshire, IL (US)

(72) Inventors: Ryan E. Brock, Cary, IL (US); Michael J. Ringholm, Coplay, PA (US); Chris Kenley, Gurnee, IL (US); Corbin P. Johnson, Arlington Heights, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,188

(22) Filed: Feb. 16, 2024

(65) Prior Publication Data
US 2024/0192947 A1 Jun. 13, 2024

Related U.S. Application Data

(63) Continuation of application No. 17/694,840, filed on Mar. 15, 2022, now Pat. No. 11,907,703.

(51) Int. Cl.
G06F 9/44 (2018.01)
G06F 8/65 (2018.01)
H04L 67/00 (2022.01)
(52) U.S. Cl.
CPC .............. *G06F 8/65* (2013.01); *H04L 67/34* (2013.01)

(58) Field of Classification Search
CPC ......................................................... G06F 8/65
USPC ........................................................ 717/172
See application file for complete search history.

(56) References Cited

U.S. PATENT DOCUMENTS

| | | | |
|---|---|---|---|
| 9,055,385 B1* | 6/2015 | Singh ...................... | H04W 4/21 |
| 9,229,902 B1* | 1/2016 | Leis ...................... | H04L 41/082 |
| 10,747,520 B2* | 8/2020 | Shepard ................. | G06Q 40/00 |
| 2020/0326919 A1 | 10/2020 | Kaler et al. | |
| 2020/0379744 A1 | 12/2020 | Bhupati et al. | |
| 2021/0397436 A1 | 12/2021 | Le et al. | |

OTHER PUBLICATIONS

International Search Report and Written Opinion for International Application No. PCT/US2023/14972 mailed on Jun. 22, 2023.

* cited by examiner

*Primary Examiner* — Evral E Bodden

(57) ABSTRACT

A software deployment method in a server includes: obtaining a software update for deployment to a plurality of media processing devices; performing a primary deployment phase by: (i) transmitting the software update to selected media processing devices according to a primary deployment rate; (ii) responsive to the transmission, for each selected media processing device, updating a status indicator representing whether deployment of the software update succeeded; and (iii) determining, based on the status indicators, whether an update promotion condition has been satisfied; in response to determining that the update promotion condition has been satisfied, performing a secondary deployment phase by: transmitting the software update to further selected media processing devices according to a secondary deployment rate exceeding the primary deployment rate.

13 Claims, 6 Drawing Sheets

SYSTEM AND METHOD FOR PHASED SOFTWARE UPDATE DEPLOYMENT

RELATED APPLICATIONS

The present application is a continuation of U.S. patent application Ser. No. 17/694,840 (now U.S. Pat. No. 11,907, 703), filed on Mar. 15, 2022, which is incorporated by reference herein in its entirety.

BACKGROUND

Firmware executed by various computing devices, such as media processing devices (e.g., desktop label printers, and the like), may be periodically updated. Such devices may, however, be operated by a wide variety of distinct users in varying locations, complicating efforts to deploy updated firmware to the devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
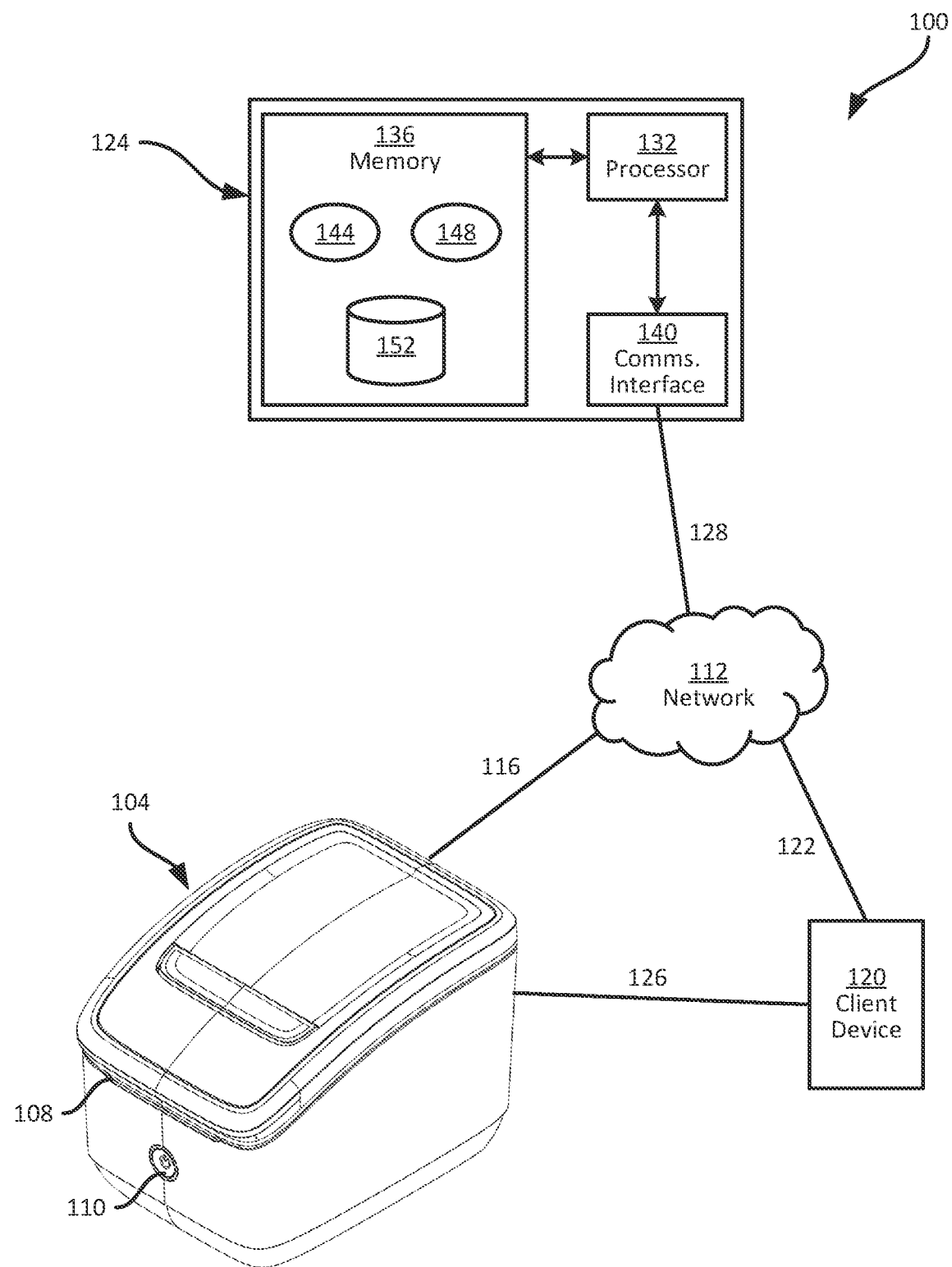
FIG. 1 is a diagram of a phased software deployment system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a software deployment method in a server, the method comprising: obtaining a software update for deployment to a plurality of media processing devices; performing a primary deployment phase by: (i) transmitting the software update to selected media processing devices according to a primary deployment rate; (ii) responsive to the transmission, for each selected media processing device, updating a status indicator representing whether deployment of the software update succeeded; and (iii) determining, based on the status indicators, whether an update promotion condition has been satisfied; in response to determining that the update promotion condition has been satisfied, performing a secondary deployment phase by: transmitting the software update to further selected media processing devices according to a secondary deployment rate exceeding the primary deployment rate.

Additional examples disclosed herein are directed to a computing device, comprising: a communications interface; and a processor configured to: obtain a software update for deployment to a plurality of media processing devices; to perform a primary deployment: (i) transmit the software update to selected media processing devices according to a primary deployment rate; (ii) responsive to the transmission, for each selected media processing device, update a status indicator representing whether deployment of the software update succeeded; and (iii) determine, based on the status indicators, whether an update promotion condition has been satisfied; in response to determining that the update promotion condition has been satisfied, to perform a secondary deployment phase: transmit the software update to further selected media processing devices according to a secondary deployment rate exceeding the primary deployment rate.

Further examples disclosed herein are directed to a non-transitory computer-readable medium storing instructions executable by a processor to: obtain a software update for deployment to a plurality of media processing devices; to perform a primary deployment: (i) transmit the software update to selected media processing devices according to a primary deployment rate; (ii) responsive to the transmission, for each selected media processing device, update a status indicator representing whether deployment of the software update; and (iii) determine, based on the status indicators, whether an update promotion condition has been satisfied; in response to determining that the update promotion condition has been satisfied, to perform a secondary deployment phase: transmit the software update to further selected media processing devices according to a secondary deployment rate exceeding the primary deployment rate.

FIG. 1 illustrates a system 100 for deploying software updates to cloud-connected media processing devices. The system 100 includes a media processing device 104 (also referred to simply as a printer 104), which in the present example includes a label printer configured to apply indicia (e.g., via a thermal print head, although any of a variety of other impression technologies may be employed by the printer 104) to labels from a supply of labels housed within a body of the printer 104. Processed labels may be dispensed from an outlet 108 of the printer 104. Although a single printer 104 is illustrated in FIG. 1, it will be apparent from the discussion below that the system 100 can include a plurality of printers 104. In some examples, the system 100 includes a significant number of printers 104, e.g., thousands of printers 104, each having the features described herein.

The printer 104 may be, for example, a desktop label printer, configured to process labels with widths of between about two inches and about four inches. In other words, the housing of the printer 104 may be relatively small and may therefore omit operator controls such as a keypad, a touch screen, or the like. Instead, the physical operator interface of the printer 104 may be limited to a power button 110. The operator interface can also include additional components in other examples, however. Due to the restrictive size of the printer 104 and/or to reduce manufacturing cost and complexity, the printer 104 may also lack physical communication ports, such as a Universal Serial Bus (USB) port enabling a direct link to be established between the printer 104 and a computing device (e.g., a desktop computer operated by a user of the printer 104).

At least in part as a result of the limited control and communication components of the printer 104, control of the printer 104 is instead effected by the transmission of commands to the printer from other computing devices via a network 112. The network 112 includes any suitable combination of local and wide-area networks. Specifically, the printer 104 is connected to the network 112 via a link 116 (e.g., a wireless link) implemented by a local network (e.g., a wireless local area network based on a Wi-Fi or other suitable standard), which is in turn connected to a wide-area network. The printer 104 therefore includes a controller and a communications interface, e.g., to communicate with other devices over the network 112 and the link 116.

Control of the printer 104 via the network 112 includes transmission of output commands to the printer, e.g., to apply indicia specified in the output command onto one or more labels from the supply mentioned earlier. Output commands can be generated from a variety of computing devices, such as a client device 120 connected to the network via a link 122. The client device 120 can be a smartphone, a tablet computer, or the like. In general, the client device 120 can initiate output commands for the printer 104 following authentication with a server 124 (e.g., via credentials such as an account identifier and password previously assigned to an operator of the client device 120). The server 124, as seen in FIG. 1, is also connected with the network 112 via a link 128. Following authentication, the client device 120 can transmit output commands (e.g., a command to print a particular label or set of labels) to the server 124, which processes the output commands and relays the processed output commands to the printer 104. In some cases, the client device 120 may also establish a direct connection 126, e.g., via Bluetooth or other local connections, with the printer 104. The direct connection 126 may be employed to initiate provisioning of the printer 104, for example when the printer is started for the first time, and/or after a factory reset.

Control of the printer 104 also includes the deployment of software updates to the printer 104. For example, the printer 104 can include a processor configured to execute firmware (e.g., software tailored to the specific hardware components of the printer 104) that enables the processing of labels, communication over the network 112, and the like. Updated versions of the firmware (or any other software executed by the printer 104, configuration settings for such software, and the like) may periodically be developed, e.g., to correct bugs, implement new functionality at the printer 104, and the like.

Updated software such as a new firmware version may be developed by a manufacturer of the printer 104, or an associated entity, and provided to the server 124 (which may also be operated by the manufacturer). Deploying the firmware update from the server 124 to the printer 104, and to the potentially large number of other printers 104 in the system 100, involves various challenges, however.

For example, initiation of firmware updates by the individual users of the printers 104 in the system 100 may be complicated by the minimal control inputs available at the printer 104, and by the lack of physical communication ports, as mentioned above. Further, even notwithstanding those physical limitations, the users of the printers 104 may have widely varying degrees of technological expertise, and many users may fail to initiate firmware updates. Some printers 104 may therefore lack newly implemented functionality, and/or remain vulnerable to bugs corrected in the updated firmware. Further, additional development resources may be necessary to support a broader range of outdated versions of the firmware.

The server 124 therefore includes various features enabling the deployment of software updates, such as firmware updates, to the printers 104 over the network 112. As will be discussed below, the server 124 enables software update deployment while also mitigating interruptions to regular use of the printers 104 by their users. The deployment mechanisms implemented by the server 124 may also mitigate the impact of software deployment to potentially large numbers of printers 104 on the computational resources of the server 124 itself and/or the network 112.

The server 124 includes a processor 132 (e.g., one or more central processing units (CPUs)), interconnected with a non-transitory computer readable storage medium, such as a memory 136 including a suitable combination of volatile memory (e.g., Random Access Memory or RAM) and non-volatile memory (e.g., read only memory or ROM, Electrically Erasable Programmable Read Only Memory or EEPROM, flash memory). The processor 132 and the memory 136 each comprise one or more integrated circuits.

The server 124 also includes a communications interface 140 interconnected with the processor 132. The communications interface 140 includes suitable hardware (e.g., transmitters, receivers, network interface controllers and the like) allowing the server 124 to communicate over the network 112 with other computing devices—particularly the printer 104 and the client device 120.

The components of the server 124 can be disposed in a housing, or distributed among a plurality of housings, e.g., for geographical distribution of the functionality of the server 124. The functionality described below can also be implemented, in some examples, by more than one server (whether distributed or not).

The memory 136 stores computer readable instructions executable by the processor 132 to perform various functionality related to the relaying of output commands and the deployment of software updates to the printers 104. In particular, the memory 136 stores a print application 144, and a deployment application 148. Execution of the print application 144 by the processor 132 configures the server 124 to transmit output commands to the printer 104, e.g., following receipt of such commands from the client device 120, and/or in response to generation of such commands via execution of the application 148.

Execution of the deployment application 148 by the processor 132 configures the server 124 to implement a staged, or phased, deployment process to deploy software updates to the printers 104 of the system 100, as will be described in greater detail below.

The memory 136 also stores, in the illustrated example, a repository 152 containing various data corresponding to each printer 104 in the system 100. The data stored in the repository 152 can include, for example, an identifier of the printer 104 (e.g., a serial number, or the like), and the above-mentioned authentication credentials. The data can also include a current software version (e.g., which version of firmware is currently installed on the particular printer 104), as well as activity data. The activity data can include a record of current and previous print jobs at the printer 104 resulting from output commands. The activity data, as will be described in further detail below can include records of individual output commands sent to the relevant printer 104, and/or collected data representing a plurality of such commands. For example, the repository 152 can contain an indication of the average number of print jobs executed by the printer 104 for each of a set of time windows (e.g., hours of the day).

Figure 2:
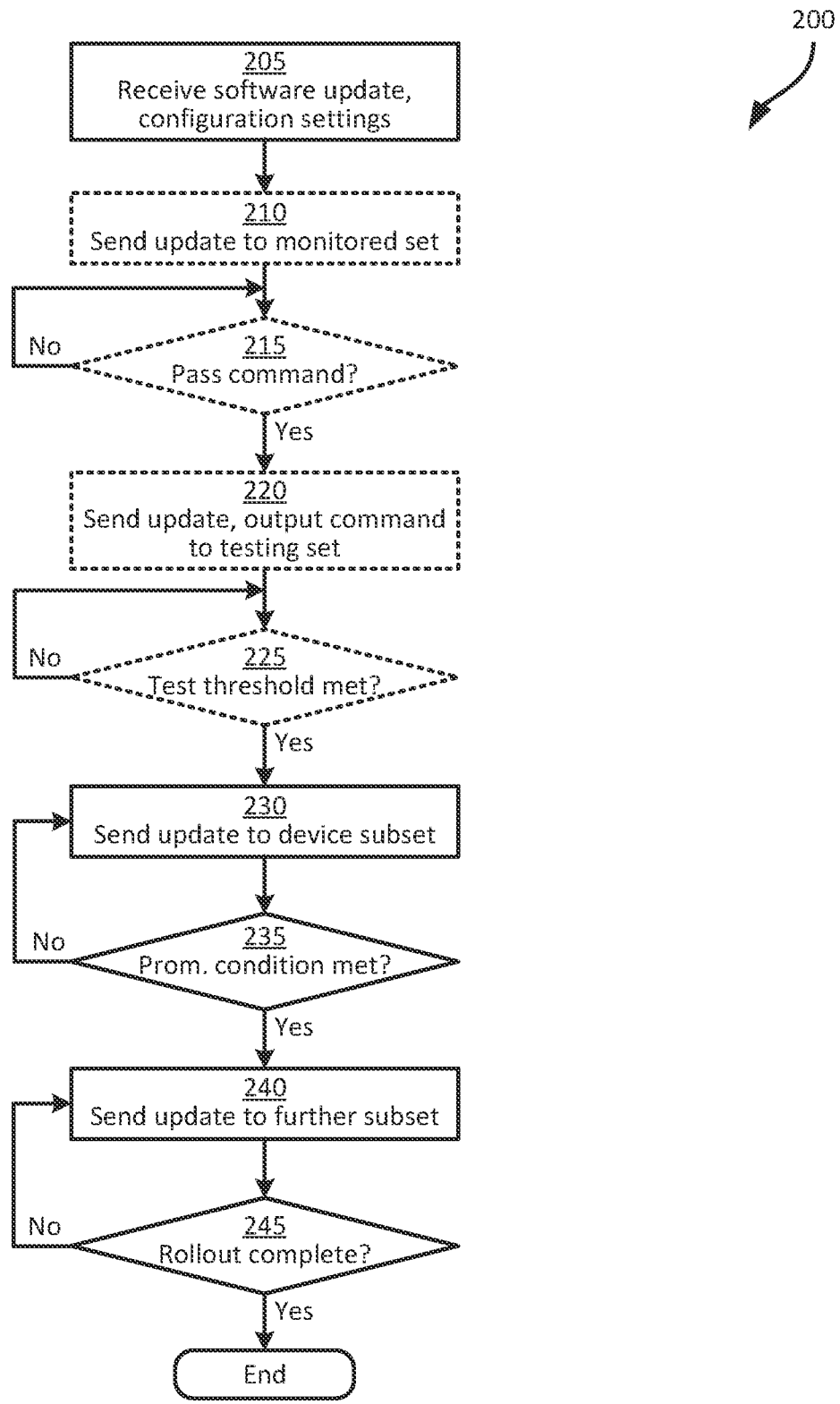
FIG. 2 is a flowchart of a method of phased software deployment.

Turning to FIG. 2, the operation of the system 100 to deploy software updates to the printers 104 will be discussed in greater detail. FIG. 2 illustrates a method 200 of phased software update deployment, and will be described in conjunction with its example performance in the system 100. Specifically, the blocks of the method 200 are performed in this example by the server 124, e.g., via execution of the application 148 by the processor 132.

At block 205, the server 124 is configured to receive a software update for deployment to the printers 104. The server 124 can also receive, at block 205, configuration settings associated with the software update. As will be discussed below, the configuration settings define certain aspects of the rollout of the software update to the printers 104. The software update and the configuration parameters can be received at the server 124 from another computing device, e.g., operated by a software developer.

Figure 3:
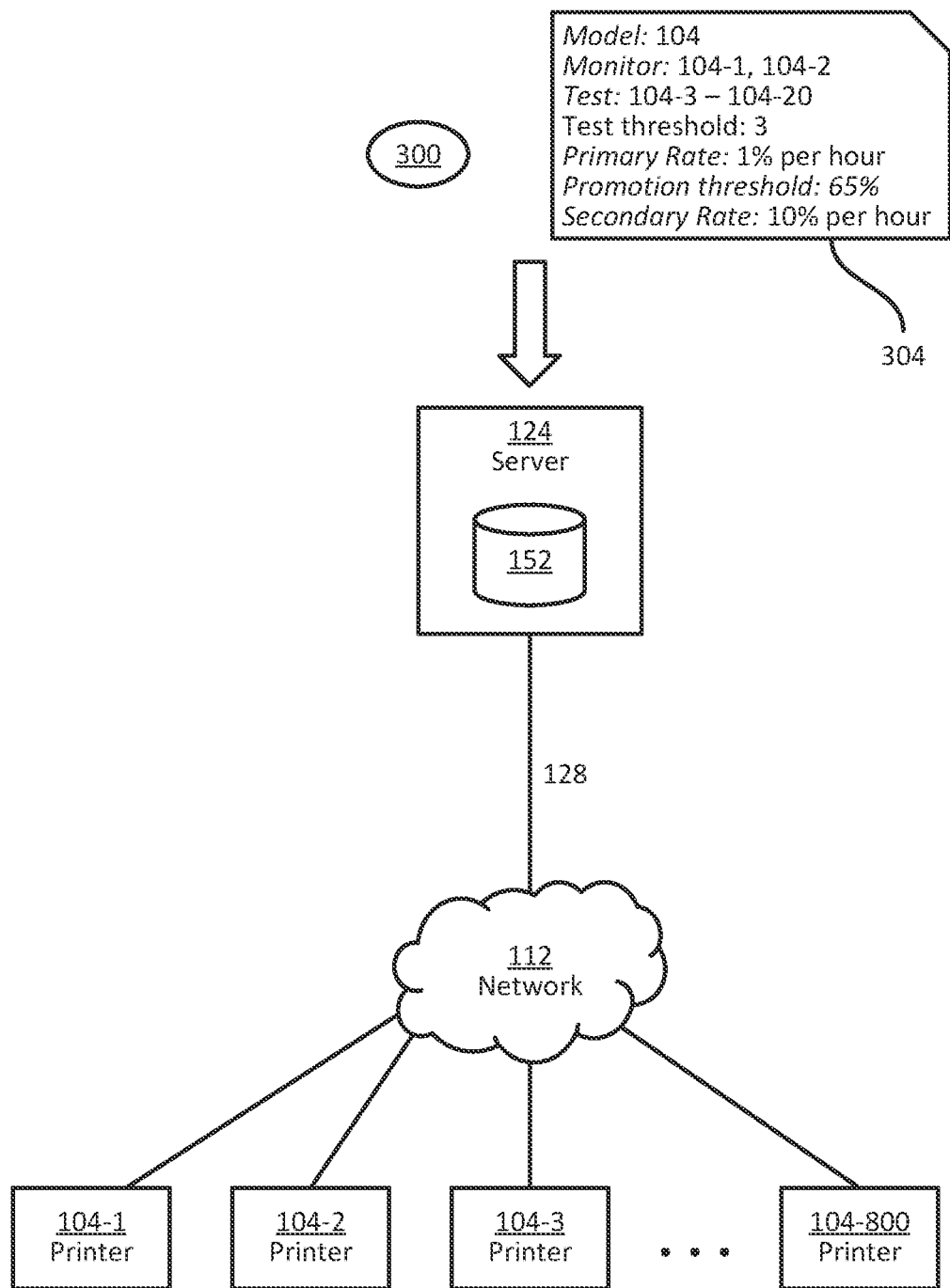
FIG. 3 is a diagram illustrating an example performance of block 205 of the method of FIG. 2.

Turning to FIG. 3, a partial view of the system 100 is shown, in which a software update 300, such as a firmware update, is received at the server 124 along with a set of configuration parameters 304. The configuration parameters guide the deployment of the software update 300 to a set of printers 104, which in this example includes a total of eight hundred printers 104, with the identifiers 104-1, 104-2, 104-3, and so on, until 104-800 (generically referred to as a printer 104, and collectively referred to as the printers 104).

The configuration parameters can include a variety of information, including an identifier of the model of printer 104 to which the software update 300 is to be applied, e.g., for systems in which more than one printer model is present. The configuration settings 304 can also include a version indicator (not shown in FIG. 3) corresponding to the software update 300, although the version indicator may also be contained within the software update 300 itself. The configuration settings 304 also define various phases, or stages, for the deployment of the software update.

The phases include an optional monitored deployment phase, in which the software update 300 is deployed to specifically identified printers 104 (the printers 104-1, and 104-2, as shown in the configuration settings 304). The phases also include an optional testing phase, which also involves deploying the software update 300 to specifically identified printers 104 (the printers 104-3 to 104-20 in the illustrated example, i.e., a total of eighteen printers 104) and awaiting a set number of confirmations corresponding to those devices (a test threshold, which in the illustrated example is three). The phases also include a primary deployment phase, in which the software update 300 is deployed to dynamically selected printers 104 according to a primary rate. In this example, the primary rate is one percent of the total population of printers 104 per hour (i.e., eight printers per hour).

The primary phase continues until a promotion threshold is reached, e.g., 65% of the total number of printers 104. Following the primary phase, a secondary deployment phase is initiated. In the secondary phase, the software update 300 is deployed to remaining (i.e., not yet updated) printers 104 according to a secondary rate that is greater than the primary rate mentioned above. In the illustrated example, the secondary rate is 10% of the printers 104 per hour, which is equivalent to eighty printers 104 per hour. As will be apparent to those skilled in the art, the above-mentioned thresholds and rates need not be specified as percentages, but can be specified as absolute numbers, or in other fractional formats. The above-noted phases are described below in greater detail, through the remainder of the method 200.

Returning to FIG. 2, at block 210 the server 124 can be configured to initiate performance of a monitored deployment phase. In some examples, e.g., when the configuration settings 304 do not include any monitored printer identifiers, blocks 210 and 215 can simply be omitted. Blocks 210 and 215 are therefore illustrated in dashed lines in FIG. 2, indicating that the monitored deployment phase is optional.

More specifically, at block 210 the server 124 is configured to send the software update 300 to a monitored set of printers 104. In this example, the monitored set is identified in the configuration settings 304. In other examples, the monitored set can be stored in the memory 136, and can therefore be omitted from the configuration settings 304. As shown in FIG. 3, the monitored set includes the printers 104-1 and 104-2. The monitored set can be, for example, a "canary" set of printers 104 under the direct control of developers of the software update 300, e.g., in a laboratory or other supervised venue.

Figure 4:
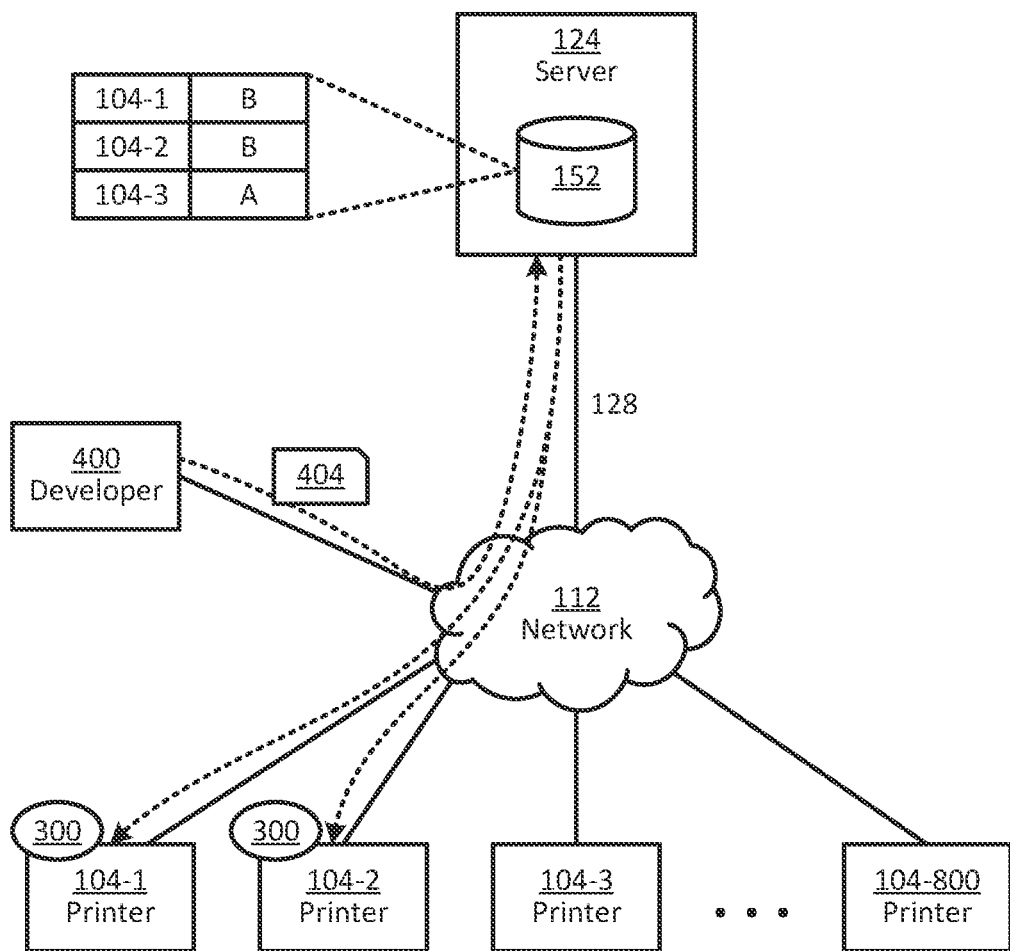
FIG. 4 is a diagram illustrating an example performance of blocks 210 and 215 of the method of FIG. 2.

Turning to FIG. 4, an example performance of block 210 is illustrated. In particular, the server 124 transmits the software update 300 to the printers 104-1 and 104-2 via the network 112. The printers 104-1 and 104-2, in turn, are configured to apply the software update 300 (e.g., to install updated firmware, or the like), and re-establish connections with the server 124. Upon reconnection of the printers 104-1 and 104-2 with the server 124, the server 124 can update the repository 152 to reflect the version of the newly applied software at the printers 104-1 and 104-2. For example, as shown in FIG. 4, the repository 152 may include records for each printer 104, including status indicators that indicate a software version (among other information not shown in FIG. 4). After deployment of the software update 300 to the printers 104-1 and 104-2, the version indicated for those printers 104 in the repository 152 is "B", whereas the repository 152 indicates that the printer 104-3 (which has not yet been updated) has an older version "A". The repository 152 can include other status indicators in addition to, or instead of, a current software version at each printer 104. For example, a status indicator can include a flag indicating an outcome (e.g., success or failure) of a recent software update.

Before initiating the next phase of the software update deployment process, returning to FIG. 2, the server 124 can be configured to determine at block 215 whether a pass command has been received. The pass command indicates that the software update 300 has been successfully tested or otherwise evaluated at the printers 104-1 and 104-2, e.g., by development staff. Referring again to FIG. 4, a developer computing device 400 is shown, which can transmit a pass command 404 to the server 124 after the above-mentioned testing or evaluation is complete. The pass command 404, in other words, can be manually initiated by developers of the software update 300, in contrast with subsequent phases of the update deployment (which can be initiated automatically). When the determination at block 215 is negative, the server 124 is configured to await the pass command. In some examples, e.g., if bugs or other issues are discovered with the software update 300, the developer device 400 may transmit an abort command to the server 124, terminating performance of the method 200.

Referring again to FIG. 2, when the determination at block 215 is affirmative, the server 124 is configured to initiate performance of a testing phase of the software update deployment process, implemented via blocks 220 and 225. As with the monitoring phase, the testing phase is optional, and therefore illustrated with dashed lines. The testing phase is distinguished from the monitoring phase at least in part by an automatic transition to the primary phase when certain testing conditions (the testing threshold discussed later) have been satisfied.

At block 220, the server 124 is configured to transmit the software update 300 to the printers 104 identified in the configuration settings 304 (the printers 104-3 to 104-20, in this example). The printers 104 identified for the testing phase can be under the direct control of the developers mentioned above, but can also be a broader set of printers 104, e.g., operated by other employees of the manufacturer of the printers 104, not necessarily involved in software development.

Figure 5:
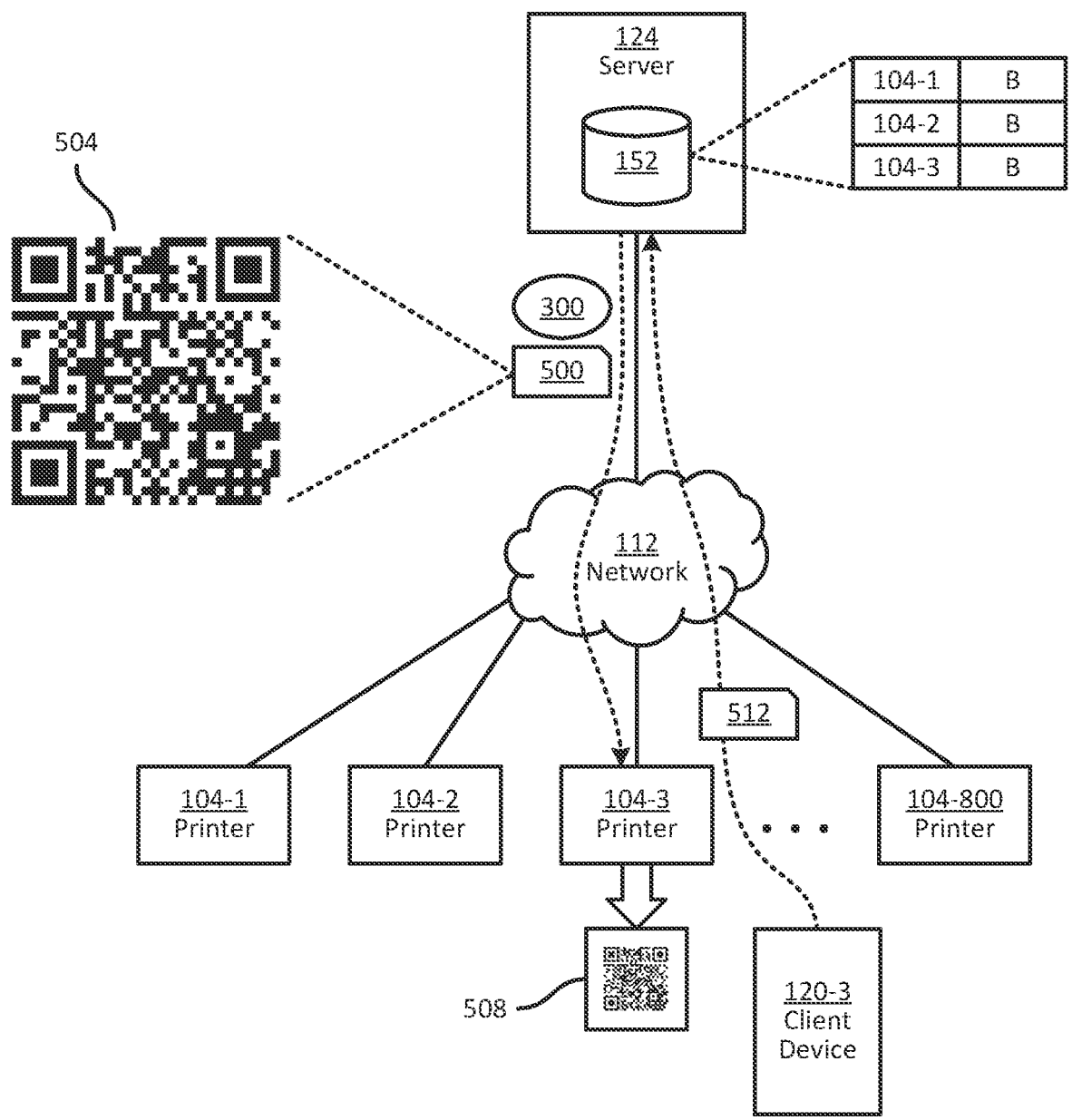
FIG. 5 is a diagram illustrating an example performance of block 220 of the method of FIG. 2.

FIG. 5 illustrates an example performance of block 210, in which the software update 300 is transmitted from the server 124 to the printer 104-3. As will be apparent, the server 124 also transmits the software update 300 to the other printers 104 in the testing set noted above. The server 124 also transmits an output command 500 to the printer 104-3. The output command 500 instructs the printer 104-3 to generate a label, in this example, after applying the software update 300. As will be seen below, the label enables a corresponding client device 120, or the operator thereof, to provide a confirmation to the server 124 that the software update 300 was successfully applied at the printer 104-3.

In this example, the output command 500 includes a machine-readable indicium, such as a QR code or other barcode, encoding confirmation data. The confirmation data can include a uniform resource locator (URL) pointing to a domain hosted by the server 124, and containing information such as an identifier of the printer 104-3 itself. In the illustrated example, the command 500 includes a QR code 504 encoding the URL www.124.com/firmwareupdates/success-104-3. Upon receipt of the software update 300, the printer 104-3 is configured to apply the software update 300, and re-establish a connection to the server 124. The printer 104-3 is also configured, based on the output command 500, to generate a label 508 containing the QR code 504. The label 508 can also include instructions (e.g., in plain text) to the operator of a client device 120-3 associated with the printer 104-3. The instructions can indicate, for example, that the operator is to scan the QR code with the client device 120-3, resulting in a request 512 containing the URL mentioned above being transmitted to the server 124. Such instructions can also be included in the output command 500. The server 124, upon receiving the request 512, can determine that a confirmation of successful update has been received for the printer 104-3. The repository 152 can also be updated to indicate the current version (i.e., "B" in this example) of the software installed at the printer 104-3.

Various other forms of confirmation are also contemplated. For example, the output command 500 can include instructions, to be printed on the label 508, to press the power button 110 of the printer 104-3 three times, and then open and close a cover of the printer 104. The printer 104-3 can be configured, upon detection of that sequence of actions, to send a confirmation message to the server 124. More generally, the output command 500 causes the printer 104-3 (and the other printers 104 in the testing set) to generate a label or other suitable output that allows an operator of the printer 104-3 to verify that the printer 104-3 can successfully print following the software update, and to inform the server 124 of the successful software update.

Returning to FIG. 2, at block 225 the server 124 is configured to determine whether a testing threshold has been met. The testing threshold, in this example, is defined in the configuration settings 304, and requires that three or more confirmations like the confirmation 512 be received for an affirmative determination. If the determination at block 225 is negative, the server 124 awaits further confirmations. The server 124 can also abort performance of the method 200, e.g., if a timeout period (which can also be defined in the configuration settings 304) is reached without sufficient confirmations being received. The server 124 can also abort performance of the method 200, e.g., if a threshold number of printers 104 in the testing set fail to re-establish connections with the server 124 for a predefined time period after transmission of the software update 300 at block 220. When performance of the method 200 is aborted, the server 124 can automatically notify the developer device 400, or other suitable entities.

As will now be apparent, the deployment of the software update 300 to the monitoring set and/or the test set enable small-scale testing of the software update 300 prior to deployment to external users (e.g., outside the manufacturer of the printers 104), and prior to deployment at scale of the software update 300.

When the determination at block 225 is affirmative (e.g., when at least three confirmations have been received from the eighteen-printer test set, in this case), the server 124 proceeds to block 230 of the method 200. The performance of blocks 230 and 235 constitute the above-mentioned primary deployment phase. In general, the primary deployment phase involves transmitting the software update 300 to the printers 104 according to a primary deployment rate. The primary deployment rate is set to limit the number of printers 104 receiving the software update 300 at any given point in time, and also serves to limit the speed at which the software update 300 is pushed out to the printers 104, reducing the number of affected printers 104 in the event of a defective software update 300.

The primary rate in this example, as shown in FIG. 3, is one percent of the total population of printers 104 per hour, or eight printers 104 per hour. In this example, the server 124 does not necessarily send the software update 300 to exactly eight printers 104 per hour. For example, the server 124 can send the software update 300 to a maximum of eight printers 104 per hour, but may also send the software update 300 to fewer printers in a given hour. That is, the primary rate may be defined by a primary subset limit, such that fewer than eight printers may be updated in a given hour, but not more than eight printers.

The server 124 is configured, at block 230, to select a time window, such as the closest future one-hour period (e.g., if the current time is 11:48 pm, the window selected at block 230 can be the time window between 12:00 am and 1:00 am). The length of the selected time period can be predefined, or can be specified in the configurations settings 304 and therefore variable between instances of the method 200.

Figure 6:
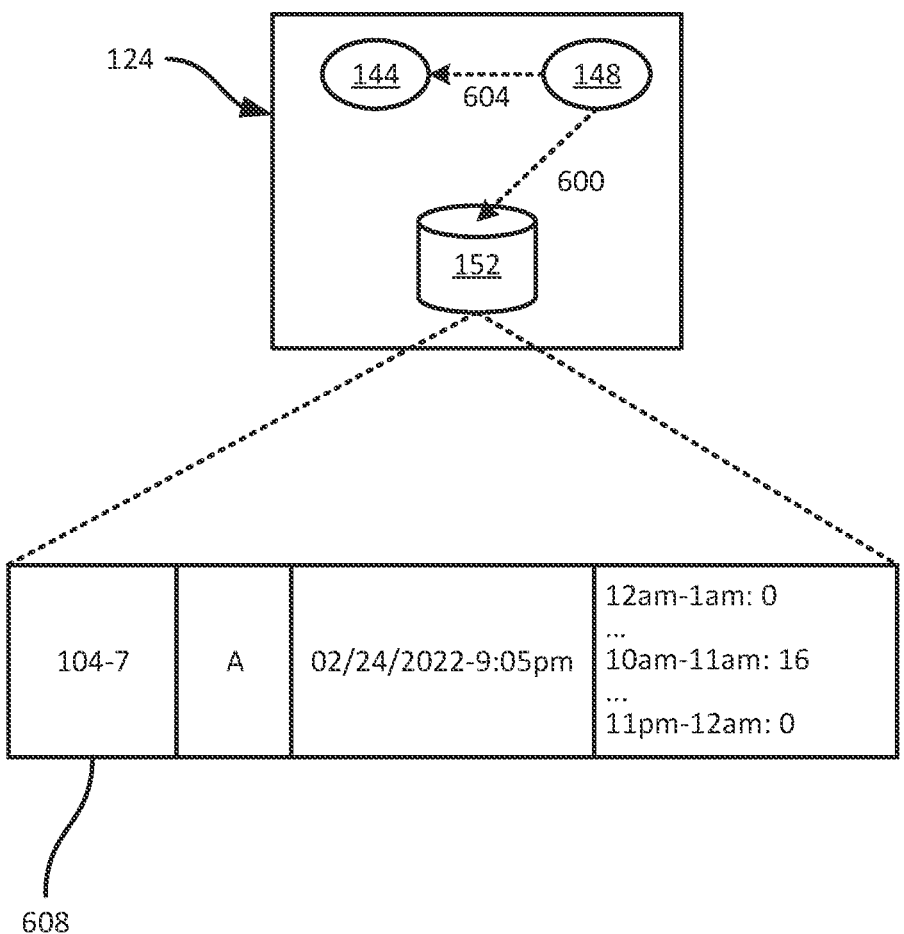
FIG. 6 is a diagram illustrating an example performance of block 230 of the method of FIG. 2.

Having selected a time window, the server 124 is configured to select a subset of the printers 104 that have not yet received the software update 300. The selection at block 230 is based on stored activity data from either or both of the repository 152 and the print application 144. FIG. 6 illustrates an example performance of such a selection, in which the application 148 can retrieve data from the repository 152 via a query 600, and/or request activity data from the application 144 via a request 604.

The activity data in the repository 152 represents historical activity of each printer 104, and can include, for example, a complete record of each previous print job completed by each printer 104. In other examples, as noted earlier, the activity data can include cumulative average numbers of print jobs per hour, covering the entire lifetime of the printer 104, or a shorter time period. The server 124 is configured, at block 230, to identify printers 104 that are unlikely to be active (i.e., executing print jobs that would be interrupted by a software update) during the selected time window.

The server 124 may initiate the selection of a subset, for example, by identifying the printers 104 with a version of the relevant software older than the version of the software update 300. The identified subset is likely to include a larger number of printers 104 than permitted by the primary rate. The server 124 is therefore configured to then identify printers 104 with historical activity below an activity threshold.

FIG. 6 illustrates an expanded view of a record 608 in the repository 152, for a printer 104-7. In addition to the printer identifier and a status indicator in the form of the version identifier "A", the record 608 includes a timestamp corresponding to execution of the most recent print job by the printer 104-7 (in this example, 9:05 pm on Feb. 24, 2022). The record 608 also includes other historical activity data, in the form of an average number of print jobs for each one-hour time window during a day. Three example periods are illustrated, with corresponding print job counts. As will be apparent, each of the twenty-four one-hour periods in a day may be represented in the record 608. Other formats can also be employed for the historical data shown in the record 608.

The server 124 can therefore be configured, at block 230, to identify printers 104 that are not up to date, and also have historical data below an activity threshold. For example, the server 124 can be configured to identify only printers 104 with no historical activity during the current time window. In other examples, the server 124 can identify printers 104 with fewer than two print jobs in the current time window, historically. In further examples, the server 124 can eliminate from the selection any printers 104 with a most recent print job within a certain threshold of the current time (e.g., ten minutes). This serves to avoid interrupting the operations of printers 104 that historically are not likely to print during the current time window, but have recently been active (even if unexpectedly).

When the printers 104 identified as set out above are greater in number than the rate limit in the configuration settings 304, the server 124 can be configured to select the subset (e.g., eight printers 104, in this case) of printers 104 from those identified above at random, or based on which printers 104 have the least historical activity for the current time window.

The server 124 can also be configured to base the selection of printers 104 at block 330 on activity data obtained from the application 144, in addition to or instead of the historical activity data mentioned above. The request 604, for example, can be a request for whether one or more specifically-identified printers 104 (e.g., those with outdated software and historical activity below a threshold, as set out above) are currently active, i.e., engaged in a print job. This serves to avoid interrupting the operations of printers 104 that historically are not likely to print during the current time window, but are nevertheless currently active and may therefore be negatively impacted by a software update. Any printers 104 that are currently active are omitted from the subset at block 230.

Having selected a subset of the printers 104, the server 124 is configured to send the software update 300 to the selected printers 104, via the network 112, during the time window selected as mentioned above. That is, when the server 124 selects the time window 12 am-1 am as noted earlier, the transmission of the software update 300 to the selected subset of printers 104 does not begin until 12 am.

The software update 300 is applied at each receiving printer 104, and upon successful application, each printer 104 re-establishes a connection with the server 124. In response to re-establishment of the connection, e.g., along with a message from the printer 104 confirming that the software version at the printer 104 has been updated, the server 124 updates the corresponding record in the repository 152 to indicate the current version of the relevant software for that printer 104. That is, the status indicator associated with the relevant printer 104 is updated to indicate that deployment of the software update succeeded.

At block 235, the server 124 is configured to determine whether an update promotion condition has been met. One or more promotion conditions are employed, and can be configured in the configuration settings 304, to determine when to accelerate deployment of the software update 300. In general, the promotion condition(s) are set to allow such acceleration only when it is likely that the software update 300 will cause few or no operational issues with the printers 104. In the present example, as shown in FIG. 3, the promotion condition includes a promotion threshold stating that the determination at block 235 is affirmative when 65 percent of the printers 104 (e.g., 520 printers 104, in this case) have been updated. Various other conditions can also be applied at block 235, such as a maximum allowable number of printers 104 that have failed to apply the update 300 (e.g., no more than a total of one percent of the printers 104, throughout the entire primary deployment phase).

When the determination at block 235 is negative, the server 124 selects the next window (e.g., 1am to 2 am) and a corresponding subset of printers, e.g., another 1% of the printers 104 with activity data indicating that they are unlikely to be active during the period from 1am to 2 am. The server 124 then repeats blocks 230 and 235 until the determination at block 235 is affirmative. The server 124, in other words, selects subsets of printers 104 for each of a sequence of time periods. In some cases, e.g., in which a number of failed updates is monitored against a maximum allowable number of failures, if the failure threshold is reached the server 124 can terminate the performance of the method 200.

When the determination at block 235 is affirmative (e.g., at least 65% of the printers 104 are updated), the server 124 initiates the performance of the secondary deployment phase. Following an affirmative determination at block 235, the server 124 can also make other configuration updates at the server 124 itself, or at other software-management infrastructure. For example, the server 124 can maintain a current version identifier of the relevant software that is to be provided to any new or factory-reset printers 104. Prior to block 235, the previous version (e.g., "A") can remain the current version identifier. Following an affirmative determination at block 235, however, the server 124 can be configured to "promote" the new version ("B") to current, meaning that any newly-configured printer 104, or factory-reset printer 104, will receive the new version.

At block 240, the server 124 is configured to deploy the software update to the remaining printers 104 (i.e., those not yet updated), according to a secondary deployment rate that is greater than the primary deployment rate. The secondary deployment rate is also defined in the configuration settings, and is eighty printers 104 per hour in this example (as seen in FIG. 3, which sets the secondary rate at ten percent of the printers 104 per hour). The selection of time windows and further subsets of the printers 104 in the secondary phase can be performed as described above in connection with the primary phase, with the exception of the higher rate of deployment. In some examples, the time windows used in the secondary phase can be of different lengths than those used in the primary phase.

Following transmission of the software update 300 to a selected further subset of printers 104 at block 240, the server 124 is configured to determine, at block 245, whether every printer 104 has been updated from version "A" to version "B" of the relevant software. When the determination is negative, the server 124 repeats block 240. As with block 235, a failure threshold can also be monitored at block 240. The failure threshold may be the same as, or higher than, a failure threshold monitored at block 235. When the determination at block 245 is affirmative, performance of the method 200 ends.

As will be apparent to those skilled in the art, deploying a new software version to a large number of printers 104 as discussed above may take place over several days, or longer periods of time. In some cases, a further version "C" of the same software, superseding the software update 300, may be developed and deployed to the server 124. In those cases, the existing update process may simply be terminated and a new instance of the method 200 may be initiated, such that some printers 104 will be updated from "B" to "C", while others will be updated from "A" to "C".

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A software deployment method in a server, the method comprising:
  performing a primary deployment phase by:
    transmitting a software update to selected devices of a plurality of devices according to a primary deployment rate for each of a sequence of time windows by selecting a subset of the plurality of devices based on stored activity data and transmitting the updated software to each device in the subset, a number of devices in the subset is limited by a primary subset limit;

in response to an update promotion condition being satisfied, performing a secondary deployment phase by:
transmitting the software update to further selected devices of the plurality of devices according to a secondary deployment rate exceeding the primary deployment rate for each of a sequence of further time windows by selecting the further subset of the devices based on stored activity data and transmitting the updated software to each device in the further subset, a number of devices in the further subset is limited by a secondary subset limit greater than the primary subset limit.

2. The method of claim 1, wherein the stored activity data indicates historical activity for the plurality of devices; and
wherein selecting the subset includes selecting the plurality of devices with historical activity below a threshold during a current time window.

3. The method of claim 1, wherein selecting the subset includes determining, based on the activity data, at least one of:
(i) that each device in the subset is not currently active, and
(ii) that each device in the subset has not been active within a configurable period preceding a current time.

4. The method of claim 1, further comprising determining that the update promotion condition has been satisfied by:
determining whether a threshold portion of the plurality of devices in the subset have status indicators corresponding to successful deployment of the updated software.

5. The method of claim 1, further comprising, prior to performing the primary deployment phase, performing a testing deployment phase by:
transmitting, to a testing subset of the plurality of devices, the software update and an output command; and
receiving a threshold number of update confirmations.

6. The method of claim 5, further comprising, prior to performing the testing deployment phase, performing a monitored deployment phase by:
transmitting the software update to a monitored subset of the plurality of devices; and
receiving a command to proceed to the testing deployment phase.

7. A computing device, comprising:
a communications interface; and
a processor configured to:
perform a primary deployment to:
transmit a software update to selected devices of the plurality of devices according to a primary deployment rate for each of a sequence of time windows based on selection a subset of the plurality of devices based on stored activity data and transmission of the updated software to each device in the subset, a number of devices in the subset is limited by a primary subset limit;
in response to an update promotion condition being satisfied, perform a secondary deployment phase to:
transmit the software update to further selected devices of the plurality of devices according to a secondary deployment rate exceeding the primary deployment rate for each of a sequence of further time windows based on selection of a further subset of the devices based on stored activity data and transmission of the updated software to each device in the further subset, a number of devices in the further subset is limited by a secondary subset limit greater than the primary subset limit.

8. The computing device of claim 7, wherein the stored activity data indicates historical activity for the plurality of devices; and
wherein the processor is configured, to select the subset, to select the plurality of devices with historical activity below a threshold during a current time window.

9. The computing device of claim 8, wherein the processor is configured, to select the subset, to determine, based on the activity data, at least one of:
(i) that each device in the subset is not currently active, and
(ii) that each device in the subset has not been active within a configurable period preceding a current time.

10. The computing device of claim 8, wherein the processor is configured, to determine whether the update promotion condition has been satisfied, to:
determine whether a threshold portion of the devices in the subset have status indicators corresponding to successful deployment of the updated software.

11. The computing device of claim 8, wherein the processor is further configured, to perform a testing deployment phase prior to the primary deployment phase, to:
transmit, to a testing subset of the plurality of devices, the software update and an output command; and
receive a threshold number of update confirmations.

12. The computing device of claim 11, wherein the processor is further configured, to perform a monitored deployment phase prior to the testing deployment phase, to:
transmit the software update to a monitored subset of the plurality of devices; and
receive a command to proceed to the testing deployment phase.

13. A non-transitory computer-readable medium storing instructions executable by a processor to:
perform a primary deployment to:
transmit the software update to selected devices of the plurality of devices according to a primary deployment rate for each of a sequence of time windows based on selection a subset of the plurality of devices based on stored activity data and transmission of the updated software to each device in the subset, a number of devices in the subset is limited by a primary subset limit;
in response to an update promotion condition being satisfied, perform a secondary deployment phase to:
transmit the software update to further selected devices of the plurality of devices according to a secondary deployment rate exceeding the primary deployment rate for each of a sequence of further time windows based on selection of a further subset of the devices based on stored activity data and transmission of the updated software to each device in the further subset, a number of devices in the further subset is limited by a secondary subset limit greater than the primary subset limit.

* * * * *